US008588082B2

(12) United States Patent
Gintis et al.

(10) Patent No.: US 8,588,082 B2
(45) Date of Patent: Nov. 19, 2013

(54) NETWORK TESTING USING CONTROL PLANE AND DATA PLANE CONVERGENCE

(75) Inventors: Noah Gintis, Westlake Village, CA (US); Alok Srivastava, Woodland Hills, CA (US); Victor Alston, Oak Park, CA (US); Dean Lee, Woodland Hills, CA (US)

(73) Assignee: Ixia, Calabasas, CA (US)

( * ) Notice: Subject to any disclaimer, the term of this patent is extended or adjusted under 35 U.S.C. 154(b) by 725 days.

(21) Appl. No.: 12/565,412

(22) Filed: Sep. 23, 2009

(65) Prior Publication Data

US 2011/0069621 A1 Mar. 24, 2011

(51) Int. Cl.
*H04J 1/16* (2006.01)

(52) U.S. Cl.
USPC ............ 370/244; 370/250; 370/251; 709/224

(58) Field of Classification Search
USPC ......... 370/242, 250, 251, 252, 229, 230, 232, 370/234, 241, 244; 709/224, 249
See application file for complete search history.

(56) References Cited

U.S. PATENT DOCUMENTS 5,568,471 A 10/1996 Hershey et al.
5,867,483 A * 2/1999 Ennis et al. .................. 370/252
5,905,713 A 5/1999 Anderson et al.
6,108,800 A 8/2000 Asawa
6,279,124 B1 8/2001 Brouwer
6,430,617 B1 8/2002 Britt et al.
6,526,259 B1 2/2003 Ho
6,717,917 B1 * 4/2004 Weissberger et al. ......... 370/252
6,826,259 B2 11/2004 Hoffman
7,099,438 B2 8/2006 Rancu et al.
7,177,268 B2 * 2/2007 Shinagawa .................... 370/217
7,895,227 B1 * 2/2011 Henderson .................... 707/769
7,961,605 B2 * 6/2011 Gusat et al. ................... 370/229
2004/0236866 A1 11/2004 Dugatkin et al.
2006/0190594 A1 * 8/2006 Jorgenson et al. ............ 709/224
2008/0219164 A1 * 9/2008 Shimonishi ................... 370/235
2008/0259806 A1 * 10/2008 Jorgenson ..................... 370/242
2009/0196176 A1 * 8/2009 Nishimura ................. 370/230.1

FOREIGN PATENT DOCUMENTS

WO WO 2004044546 5/2004

OTHER PUBLICATIONS

Agilent Technologies, The Journal of Internet Test Methologies—Edition 3.1, Sep. 30, 2007, accessed Oct. 1, 2010, http://www.ixiacom.com/pdfs/test_plans/agilent_journal_of_internet_test_methodologies.pdf, index and pages 4-15 through 4-18 and 8-14 through 8-15.
Poretsky, et al., Terminology for Benchmarking Link-State IGP Data Plane Route Convergence, Internet Engineering Task Force, IETF; Standard working draft, Internet Society (ISOC) 4, Rue Des Falaises CH-1205 Geneva, Switze, vol. bmwg, No. 18, Jul. 13, 2009, XP015063415, pp. 1-27.
Poretsky, et al., Benchmarking Methodology for Link-State IGP Data Plane Route Convergence, Internet Engineering Task Force, IETF; Standard working draft, Internet Society (ISOC) 4, Rue Des Falaises CH-1205 Geneva, Switze, vol. bmwg, No. 18, Jul. 13, 2009, XP015063414, pp. 1-36.

(Continued)

*Primary Examiner* — Awet Haile
(74) *Attorney, Agent, or Firm* — SoCAl IP Law Group LLP; Mark A. Goldstein

(57) ABSTRACT

There is disclosed a system and method for implementing a control plane/data plane test to evaluate the performance of a device under test upon the occurrence of a critical event. The method may be performed by a network testing system.

24 Claims, 5 Drawing Sheets

(56) References Cited

OTHER PUBLICATIONS

European Patent Office, European Search Report and Written Opinion for European Application No. 10 008 578.6, Mail Date Nov. 12, 2010, pp. 1-11.

IXIA Communications, IxExplorer User's Guide, Revision 2.1.0, Nov. 1, 1999, pp. 1-384.

IXIA Communications, Specifications for Load Modules—Multilayer Gigibit Ethernet for LM1000LX, LM1000SX, LM1000GBIC, LM1000T, Product Specification Sheet, 2 pages, Nov. 1999.

IXIA Communications, The Ixia 200 Traffic Generator and Analyzer, Product Description, 199701999, last accessed on Aug. 15, 2003, file://C:/DS/IXIA/Patents/081403/ix200.htm, pp. 1-2.

IXIA Communications, Ixia 200 Chassis, Product Description p. 1, Nov. 1999.

* cited by examiner

© 2009 Ixia

© 2009 Ixia

© 2009 Ixia

© 2009 Ixia

NETWORK TESTING USING CONTROL PLANE AND DATA PLANE CONVERGENCE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to network communications device testing.

2. Description of the Related Art

Networks such as the Internet carry a variety of data communicated using and through a variety of network devices including servers, routers, hubs, switches, and other devices. Before placing a network into use, the network, including the network devices, network media, network segments and network applications included therein, may be tested to ensure successful operation. Network devices and applications may be tested, for example, to ensure that they function as intended, comply with supported protocols, and can withstand anticipated traffic demands. Such testing may also be performed on already deployed network devices, network segments and network applications.

To assist with the construction, installation and maintenance of networks, network applications and network devices, networks may be augmented with network analyzing devices, network conformance systems, network monitoring devices, and network traffic generators, all which are referred to herein as network testing systems. The network testing systems may allow for analyzing the performance of networks, network applications and network devices by capturing, modifying, analyzing and/or sending network communications. The network testing systems may be used to evaluate how well a network device or network segment handles data communication, streaming media and voice communications.

DETAILED DESCRIPTION

Description of Apparatus

Figure 1:
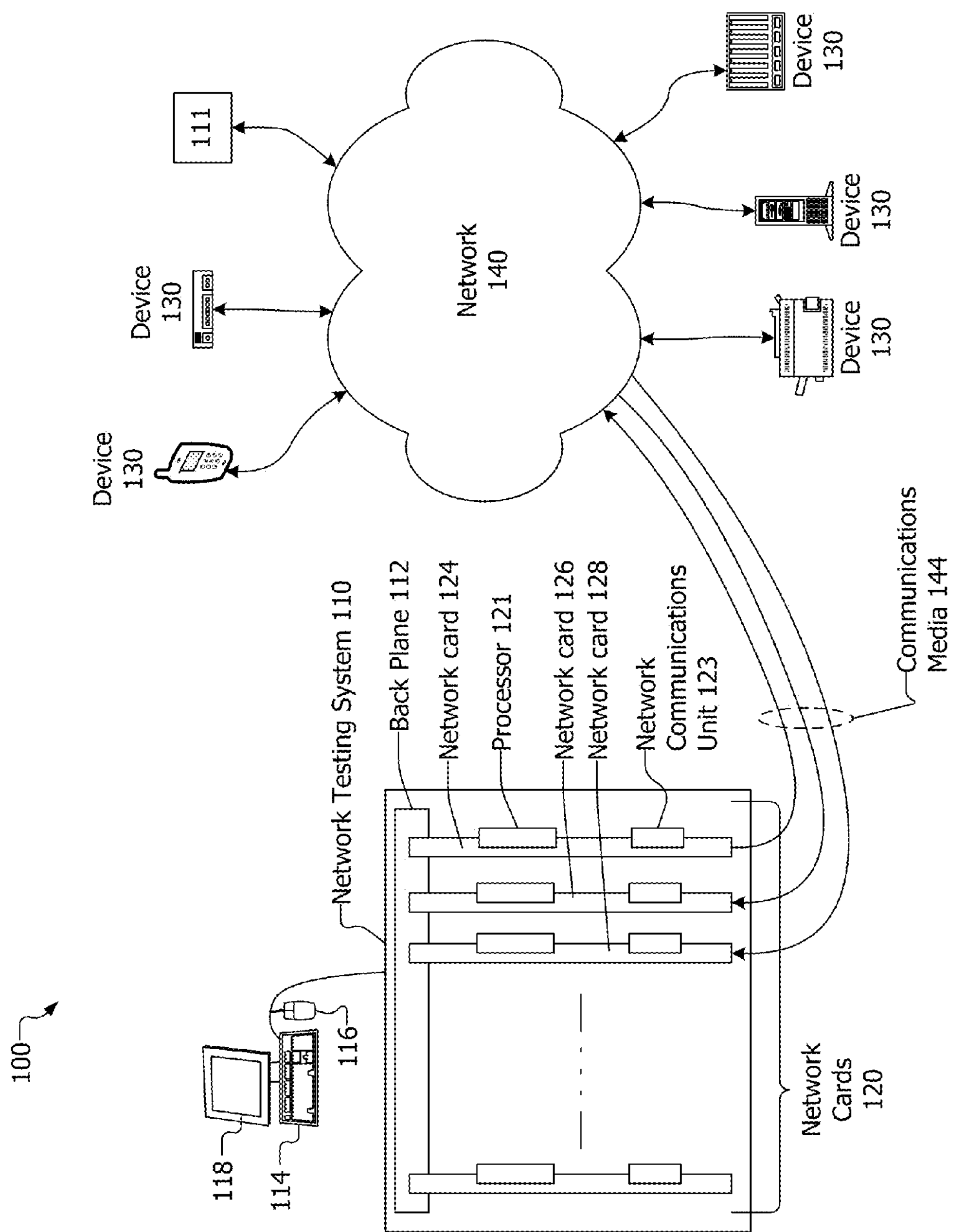
FIG. 1 is a block diagram of an environment in which network testing including control and data plane convergence may be implemented.

FIG. 1 is a block diagram of an environment in which network testing including control and data plane convergence may be implemented. The environment 100 shows a network testing system 110 in which methods for receiving, processing and executing network tests may be implemented. The network test may be system default tests and may be user modified or user specified. The environment 100 includes network testing system 110 coupled via at least one network card 120 to a network 140 over a communications medium 144. The network testing system 110 may include or be one or more of a performance analyzer, a conformance validation system, a network analyzer, a packet blaster, a network management system, a combination of these, and/or others.

The network testing system 110 may be used to evaluate or measure characteristics and performance of a network communications device or system, including the throughput of network traffic, the number of dropped packets, jitter, latency, packet delay, and many others. The network testing system may be used to evaluate the performance of network communications devices such as, for example, routers, gateways, firewalls, load balancers, and other network devices and the software running thereon.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a back plane 112. The network cards 120 may be coupled with back plane 112. One or more network cards 120 may be included in network testing system 110. The network cards 120 may be permanently installed in the network testing system 110, may be removable, or may be a combination thereof.

The network testing system 110 and/or one or more of the network cards 120 may include an operating system such as, for example, versions of Linux, Unix and Microsoft Windows.

Network card 120 is coupled with network 140 via a communications medium 144. Although a single connections over communications medium 144 is shown, each of the network cards 120 may be connected with network 140 over a communications medium. In one embodiment, the network cards may have two or more connections each over a communications medium with the network 140 and/or with multiple networks. The communications medium may be, for example, wire lines such as an Ethernet cable, fibre optic cable, and coaxial cable, and may be wireless.

The network testing system 110 and the network cards 120 may support one or more well known higher level (OSI Layers 3-7) communications standards or protocols such as, for example, one or more versions of the User Datagram Protocol (UDP), Transmission Control Protocol (TCP), Internet Protocol (IP), Internet Control Message Protocol (ICMP), Internet Group Management Protocol (IGMP), Stream Control Transmission Protocol (SCTP), Session Initiation Protocol (SIP), Hypertext Transfer Protocol (HTTP), Address Resolution Protocol (ARP), Reverse Address Resolution Protocol (RARP), File Transfer Protocol (FTP), Real-time Transport Protocol (RTP), Real-time Transport Control Protocol (RTCP), Real-Time Streaming Protocol (RTSP), the Media Gateway Control Protocol (MEGACO), the Session Description Protocol (SDP), Border Gateway Protocol (BGP), Enhanced Interior Gateway Routing Protocol (EIGRP), Multiple Spanning Tree Protocol (MSTP), Open Shortest Path First (OSPF), Protocol-Independent Multicast—Sparse Mode (PIM-SM), Intermediate System to Intermediate System (IS-IS or ISIS), Per-VLAN Spanning Tree Plus (PVST+), Rapid Per-VLAN Spanning Tree Plus (RPVST+), and Simple Mail Transfer Protocol (SMTP); may support one or more well known lower level communications standards or protocols (OSI Layers 1-2) such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as I.LINK® and FIREWIRE®); may support proprietary protocols; and may support other protocols. Each network card 120 may support a single communications protocol, may support a number of related protocols, or may support a number or combination of unrelated protocols.

The term "network card" as used herein encompasses line cards, test cards, analysis cards, line cards, network line cards, load modules, interface cards, network interface cards, data interface cards, packet engine cards, service cards, smart cards, switch cards, relay access cards, CPU cards, port cards, and others.

The network cards 120 may include one or more processors 121 and one or more network communications units 123. In another embodiment, the network cards 120 may have no processors 121 and may include one or more network communications units 123. In the embodiment in which the network cards do not include a processor, processing may be performed by a processor on a motherboard of the network testing system 110, on another card, on the backplane or by a remote or external unit. When the network card 120 includes two or more network communications units 123, the network card 120 is in effect two or more network capable devices. That is, a network card 120 having n network communications units 123 may function as n network capable devices.

The network communications unit 123 may be implemented as one or more field programmable gate arrays (FPGA), application specific integrated circuits (ASIC), programmable logic devices (PLD), programmable logic arrays (PLA), other kinds of devices, and combinations of these. The network communications unit 123 may support one or more communications protocols. The network communications unit 123 may include a network interface through which the network card 120 may transmit and/or receive communications over the network 140.

The network card 120 may include and/or have access to local and/or remote memory, storage media and storage devices. Instructions to be executed by the processor 121 may be stored on and executed from a local or remote machine readable medium or storage device. A machine readable medium includes, for example, without limitation, magnetic media (e.g., hard disks, tape, floppy disks), optical media (e.g., CD, DVD, BLU-RAY DISCO), flash memory products (e.g., memory stick, compact flash and others), and volatile and non-volatile silicon products (e.g., random access memory (RAM), programmable read-only memory (PROM), electronically erasable programmable read-only memory (EEPROM), an FPGA or other PLD, and others). A storage device is a device that allows for the reading from and/or writing to a machine readable medium. Storage devices include hard disk drives, solid-state drives (SSDs), DVD drives, flash memory devices, and others.

The processor 121, network communications unit 123, and memory may be included in one or more FPGAs, PLAs, PLDs on the network cards 120. Additional and fewer units, hardware and firmware may be included in the network cards 120.

The back plane 112 may serve as a bus or communications medium for the network cards 120. The back plane 112 may also provide power to the network cards 120.

The network testing system 110 may have a computer (not shown) coupled thereto. The computer may be local to or remote from the network testing system 110. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or backplane included in the chassis.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the network capable devices 130 in the network 140. The network testing system 110 may be used to test and evaluate the network 140 and/or portions thereof, network capable devices 130, applications running on network capable devices 130, and/or services provided by network 140 and/or network capable devices 130 and/or network applications. The network testing system 110, the network cards 120, and the network communications units 123 may all be network capable devices.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these. The network 140 may be comprised of a single or numerous nodes providing numerous physical and logical paths for packets to travel. Each node may be a network capable device as described below. A node may be a computing device, a data communications device, a network capable device, a network card, or other devices as defined and described herein.

Communications on the network 140 may take various forms, including frames, cells, datagrams, packets, messages, higher level logical groupings, or other units of information, all of which are referred to herein as packets. Those packets that are communicated over a network are referred to herein as network traffic. The network traffic may include packets that represent electronic mail messages, streaming media such as music (audio) and video, telephone (voice) conversations, web pages, graphics, documents, and others.

The network capable devices 130 may be devices capable of communicating over the network 140 and/or listening to, injecting, delaying, dropping, relaying, processing, and/or modifying network traffic on network 140. The network capable devices 130 may be computing devices such as computer workstations, personal computers, servers, portable computers, set-top boxes, video game systems, media players such as BLU-RAY DISC® players, personal video recorders, telephones, personal digital assistants (PDAs), computing tablets, and the like; peripheral devices such as printers, scanners, facsimile machines and the like; network capable storage devices including disk drives such as network attached storage (NAS) and SAN devices; testing equipment such as network analyzing devices, network conformance systems, emulation systems, network monitoring devices, and network traffic generators; components such as processors, network cards and network communications units; and networking devices such as routers, relays, firewalls, hubs, switches, bridges, traffic accelerators, and multiplexers. In addition, the network capable devices 130 may include home appliances such as refrigerators, washing machines, and the like as well as residential or commercial heating, ventilation, and air conditioning (HVAC) systems, alarm systems, may also include point of sale systems and bank teller machines, and other devices or systems capable of communicating over a network. One or more of the network capable devices 130 may be devices to be tested and may be referred to as devices or systems under test.

The network testing system 110 may send communications over the network 140 to a or through a network capable device 130. The destination of communications sent by the network testing system 110 may be a device under test such as a network capable device 130, may be the network testing system 110 such as a test between two network cards in the same network testing system 110, and may be a second network testing system 111. The network testing system 111 may be similar to or the same as network testing system 110. A first network card 124 in the network testing system 110 may send communications over the network 140 to a or through a network capable device 130 that are received by a second network card 126 in the network testing system 110 or are received by a third network card in the network testing system 111. A first network communications unit in a first network card in the first network testing system 110 may send communications over the network 140 to a second network testing system 111, and a second network communications unit the first network card in the first network testing system 110 may receive communications over the network 140 from the second network testing system 111. A first network communications unit in a first network card in the network testing system 110 may send communications over the network 140 and optionally through a network capable device 130 to a second network communications unit on the same network card in the same network testing system. The network testing system 110 may listen to and capture communications on the network 140.

The methods described herein may be implemented on one or more FPGAs and/or other hardware devices, such as, for example, digital logic devices. The methods described herein may be implemented as software, namely network testing software, running on a network testing system and executed by a processor, such as a processor on a network card or a processor in a blade or other card with a processor in a network testing system. The network testing software may be stored on a volatile or nonvolatile memory device or storage medium included in or on and/or coupled with a computing device, a network testing system, a network card, or other card. The methods may be implemented on one or more network cards 120 in a single network testing system or may be implemented on one or more network cards 120 on each of two or more network testing systems.

The network testing software may provide a graphical user interface that allows users to prepare network tests, view the results of network tests, monitor network traffic, and perform other actions. The network testing software may support or provide access to tests and analysis of network traffic according to a plurality of communications protocols, including higher level and/or lower level communications protocols.

The network traffic on network 140 and produced and received by various nodes, including the ports on the network cards 120 in the network testing system 110, includes both control plane traffic and data plane traffic. The control plane and data plane are virtualizations that are useful in conceptualizing the roles of two kinds of network traffic. Control plane traffic includes packets that implement the various supported communications protocols, including administrative communications among nodes to maintain communications among the nodes. An example of control plane traffic are routing notices or packets informing a second node that a first node is inaccessible. Data plane traffic includes packets carrying data between nodes. The data plane carries network traffic that communicates data over a network. For example, those packets that carry data for an audio stream are considered to be communicated over the data plane and are considered data plane traffic.

Figure 2:
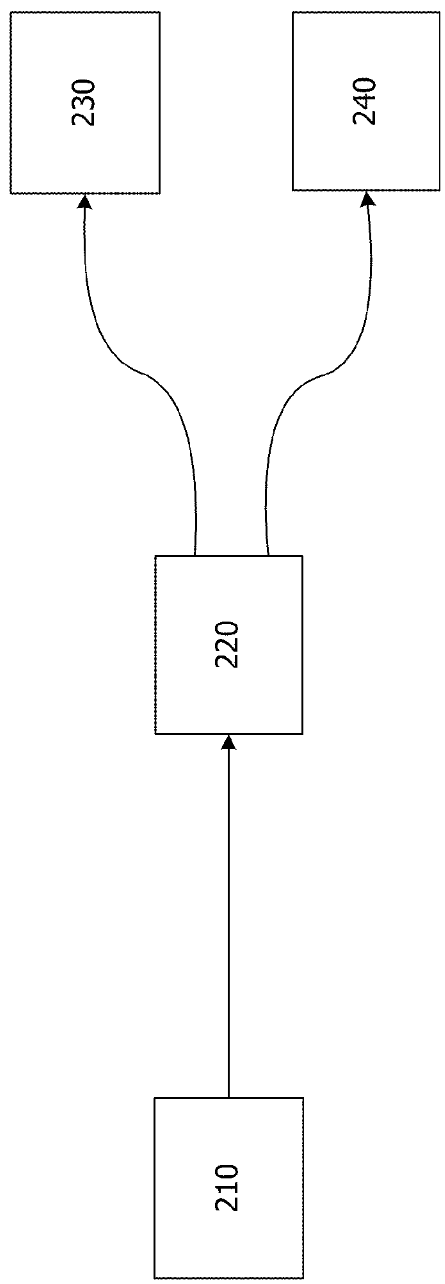
FIG. 2 is a conceptual block diagram of an environment in which network testing including control and data plane convergence may be implemented.

Referring to FIG. 2, there is shown a conceptual block diagram of an environment in which network testing including control and data plane convergence may be implemented. The methods described herein are particularly useful with a three way network test like that shown in FIG. 2. That is, a test between three network devices or three nodes. FIG. 2 shows a transmitting device 210 and two receiving devices, a first receiving device 230 and a second receiving device 240, that communicate over/through a device or system under test 220. The device or system under test 220 may be a network capable device that supports various upper level and lower level communications protocols, including, for example, one or more of the Session Description Protocol (SDP), Border Gateway Protocol (BGP), Enhanced Interior Gateway Routing Protocol (EIGRP), Multiple Spanning Tree Protocol (MSTP), Open Shortest Path First (OSPF), Protocol-Independent Multicast-Sparse Mode (PIM-SM), Intermediate System to Intermediate System (IS-IS or ISIS), Per-VLAN Spanning Tree Plus (PVST+), Rapid Per-VLAN Spanning Tree Plus (RPVST+), and Simple Mail Transfer Protocol (SMTP), and/or others. Examples of devices or systems under test 220 include routers, bridges, hubs, firewalls, switches and gateways.

As implemented in one or more network testing systems, a transmitting port 210 may communicate over a device or system under 230 test with two receiving ports, a first receiving port 230 and a second receiving port 240. In one embodiment, three ports on three different network cards on a single network testing system each coupled over a network with a device under test may implement the methods described herein. This may be, for example, referring again to FIG. 1, the transmitting port may be on network card 124, and the receiving ports 230 and 240 may be on network cards 126 and 128, respectively. In another embodiment, three ports on a single network card on a single network testing system each coupled over a network with a device under test may implement the methods described herein. In another embodiment, one transmit port on a first network card on a first network testing system and a first receive port and a second receive port on a second network testing system may be coupled over a network with a device under test to implement the methods described herein. Other similar configurations are possible.

In one embodiment, a transmit port initiates communications with a first receive port through a device under test. The transmit port sends network traffic through the device under test to the first receive port until a critical event occurs and the first receive port goes down. When the first receive port goes down, the second receive port ramps up. It is during the transition from the first receive port to the second receive port that convergence occurs. That is, data being sent on the data plane must transition from a first receive port to a second receive port in response to a critical event occurring on the control plane, on the data plane or in the device under test. The critical event being the notification that the first receive node is down or can no longer receive network traffic. As such, the activities of the data plane and the control plane converge. Control plane and data plane traffic and related data are stored when the data plane transitions from a first receive port to a second receipt port. The methods described herein are useful in emulating and testing the response to a node or route failure or other critical event. A convergence test may be designed to measure the convergence time of a routing or bridging protocol after an emulated or simulated failed link or network node or other critical event. That is the user may specify a test that includes a first link going down and a second link coming up. The performance of the device under test may be evaluated by preparing statistics based on the network traffic data obtained from received network traffic during the occurrence of the links going down and up.

As discussed herein, critical events may be categorized as four types. First, control plane events which are communications protocol dependent. The kinds of control plane events vary based on the communications protocol. Second, data plane events. Data plane events have included the first packet sent or received and the last packet sent or received, and, according to the disclosure herein, now also include the instance in time when a transmission rate exceeds a threshold or dips below a threshold. Third, link events, such as when a link comes up or goes down. And fourth, a device event, for example, recognizing the occurrence of an event at a device under test including power up, powering down, resetting, and others. All but the fourth, the device under test events, may be measured and/or evaluated as described herein.

A network test or network device test is received in which a user specifies a critical event, namely a control plane event, a data plane event, or a link event. The occurrence of the user specified critical event is used to emulate or simulate a real-world occurrence and the response of a device under test is evaluated to learn how the device under test performed. The methods described herein are used to test the functionality, performance, and/or conformance of the device or system under test. To do this, information about critical events and information about the packets received before and after the occurrence of the critical events may be stored. A user interface provided by the network testing system displays statistics about packets in real-time, where real-time means immediately or shortly after the receipt or transmission of a packet. Depending on the implementation, real-time display of statistics occurs within seconds, for example within two to six seconds, but may be displayed sooner or later, such as within microseconds, milliseconds, or tens of seconds.

The information stored and used for computing various statistics include the timestamps of packets, the size of packets, and a unique identifier included in sent and received packets. The size may be stored, for example as bits or bytes. The timestamps may be obtained a near as possible to actual transmission or receipt to make resulting calculations as accurate as possible. The timestamps are obtained from or provided by a clock on the network cards in the network testing system. The clock may be a separate component or may be included in an FPGA or other device on the network card. Other information about packets may be stored depending on user specified criteria, system defaults and/or the communications protocols being evaluated or tested on the device under test. The information about packets may be stored or indexed based on a unique identifier include in the packets, source address, destination address, or other information included in the packets, or information about the packets.

Figure 3:
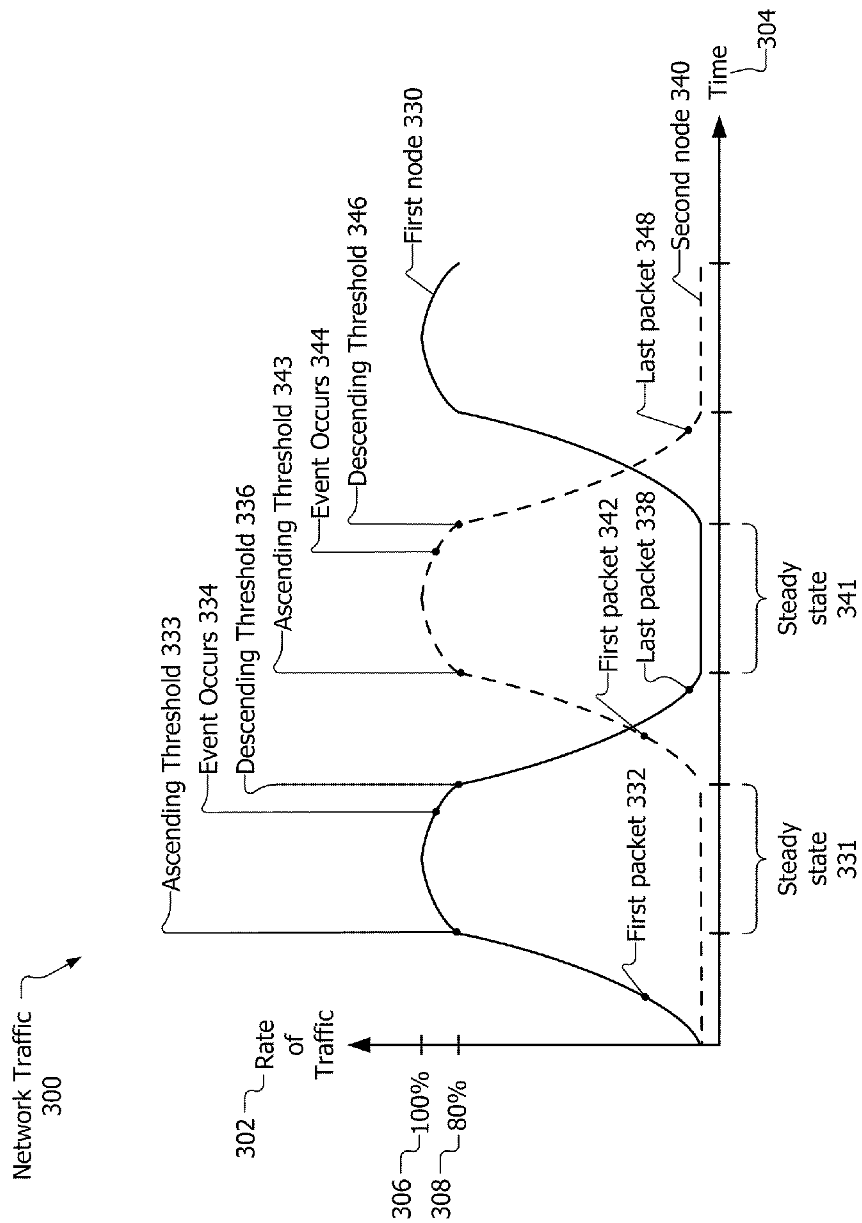
FIG. 3 is a graph showing network traffic when an embodiment of control and data plane convergence is implemented.

Referring to FIG. 3, there is shown a graph of network traffic when an embodiment of control and data plane convergence is implemented. In a three port test, a transmit port begins transmitting network traffic, and a first receive port receives the network traffic. A shown in FIG. 3, a network traffic 300 received by each of two nodes first node 330 and second node 340 is shown. The graph shows the rate of traffic 302 as the y-axis and the time 304 as the x-axis.

According to the methods described herein, as the transmit node ramps up, the first node begins receiving packets, such that a first packet 332 is received. When a maximum flow of traffic or desired persistent flow of traffic is achieved with the first node 330 at ascending threshold 333, a steady state 331 is reached. The desired flow of traffic may be designated as a threshold 308 at ascending threshold 333. Although shown as a smooth curve from the first packet 332 to the ascending threshold 333, the actual transition from the first packet 332 to a steady state may be jagged, such that the packet flow is inconsistent or bounces around before the steady state 331 is reached at ascending threshold 333. The threshold may be an average throughput for a period of time. The threshold 308 may default, for example, to 80% of maximum throughput. The maximum throughput may be limited by wire speed or other physical constraints, as such, the maximum rate may considered the full rate. The threshold may be user selectable from network testing system provided percentages of a maximum rate or throughput, such as, for example, 60%, 72% and others, or may be actual representations of the rate or throughput, such as for example, N packets per second, where the rate may be as large as or greater than millions of packets per second or as small as 1/82 packets per second. The threshold may be user settable as user specified percentages of a maximum rate or throughput, or may be actual representations of the rate or throughput.

When a control plane event 334 or other critical event occurs, such as when the route to the first node has been withdrawn, the packets received by the first node begin to decrease. When the flow of traffic to the first node 330 decreases below a descending threshold 336 (which corresponds with threshold 308), communications with the second node 340 may be initiated. The threshold 336 may default to 80%. Control plane events may be user defined, user configurable and/or system provided, user selectable and/or user settable. The control plane events available may vary based on the particular protocol selected. Control plane events may include changes to the route range or group range in various protocols. Control plane events may include changes to the root priority, VLAN port priority, root MAC address, root path cost, and others. For example, in an MSTP network device under test, a critical event may be control plane events such as when one or any of the following change: regional root Priority, regional root MAC address, regional root root cost, external root priority, external root MAC Address, external root root cost, and STP interface cost.

At this point, the second node functions like the first node while the first node is going down, is down or otherwise not included in the current network test. The second node 340 begins receiving packets, such that a first packet 342 is received. When a maximum flow of traffic or desired persistent flow of traffic is achieved with the second node 340, a steady state 341 is reached at ascending threshold 343. The desired flow of traffic may be designated by threshold 308 at ascending threshold 343. And just as with the first node 330, when a control plane event 344 occurs, such as when the route to the first node has been reestablished, the packets received by the second node begin to decrease. When the flow of traffic to the first node 330 increased above an ascending threshold (which corresponds with threshold 308), communications change to the first node 330. Network traffic may be shifted between the first and second receive nodes and back again and again as various critical events occur. The critical events may be the same events repeating themselves, or may be varying critical events.

According to this method, network traffic data at key points in time can be readily captured, stored and analyzed to evaluate the functioning of a device or system under test around the time of the occurrence of a critical event. That is, for example, when the network traffic decreases below a threshold 308, the information about packets (that is, network traffic data) from a certain point in time before the threshold is reached through a certain point in time after the threshold has been reached may be stored and analyzed. In addition, various times relating to the occurrences of key events may be stored and used to compute data for analysis of the reaction to the control plane event. The stored times and/or resulting data may be used to evaluate how quickly the first node went down, how quickly the second node came up, how long of a gap there was during the transition from the first node to the second node, and other analytical data. This data may used be to evaluate the performance of the device under test. In one embodiment, the inter-arrival time may be computed based on the difference between the timestamp of the first packet reaching the ascending threshold on the second node and the last packet above the descending threshold on the first note. Various statistics based on the inter-arrival time may be computed, including rate calculations.

For control plane events, the event name, the event start timestamp and the event end timestamp may be stored and displayed as statistics. For data plane events a convergence time may be computed based on the timestamp of packets that exceed the threshold minus the timestamp of packets that go below the descending threshold. The following calculations may also be made and the resulting statistics may be displayed to the user: ramp-up convergence time may be calculated based on the timestamp of monitored network traffic that goes above the threshold at the second port minus the timestamp of the first arrival packet on the second port; ramp-down convergence may be calculated based on the timestamp of the last arrival packet on the first port minus the timestamp of the monitored network traffic that goes below the threshold on the first port; the control plane data plane convergence time may be calculated based on the timestamp of monitored network traffic that goes above the threshold on the second port minus the timestamp of the critical event that triggered the convergence; and data plane convergence time may be calculated based on the timestamp of monitored network traffic that goes above the threshold on the second port minus the timestamp of monitored network traffic that goes below the threshold on the first port. Additional statistics may be stored, and additional calculations may be made; these are provided as examples.

The above calculations may be made upon the occurrence of a particular critical event or other event such as the first receipt of a packet at a port or the timestamp of a packet going above or below the threshold. The resulting statistics from the above calculations may be displayed shortly after the occurrence of the particular event and shortly or immediately after the calculations are made.

The time of the occurrences of the control plane event 334, the descending threshold 336 being reached, the first packet 342 of traffic sent to the second node 340, the ascending threshold 346 at the second node 340, and others may be stored. For example, a recovery from control plane event time may be computed based on the time of the control plane event occurrence 334 regarding the first node 330 and the time the ascending threshold 343 is reached at the second node 340. Many other computations may be made to evaluate the functioning of a device or system under test or a network segment resulting from a control plane event that causes control plane/data plane convergence involving a transition from a first node to a second node.

Example hardware timestamps that may be stored and used in evaluating how nodes and a device or system under test or a network segment function as a result of a control plane event include: the time when the traffic threshold has been exceeded, the time when the rate of traffic drops below the threshold, the time of first packet being received by a node, the time of last packet being received by a node, the time a link is initiated, the time of occurrence of a control plane event, for example, the time a link goes down, the time a network test is started, the time a network test is completed, the time of various control plane packets, and others.

To make the evaluation of the functioning of the device or system under test or a network segment resulting from a control plane event readily computable, the hardware timestamps for the control plane events are stored according to the data plane clock. By using the data plane clock to store control plane time stamps, the capturing of network traffic and calculation of pertinent data at key points in time surrounding the control plane event may be achieved. The data plane clock may be a clock included in an FPGA on a network card that is synchronized with other clocks on other FPGAs on other network cards in a network testing system chassis. All of the clocks on network cards in a network testing system may be synchronized with a mother board or back plane included in a network testing system chassis. The hardware timestamps may be stored such that they are within milliseconds accuracy to provide reliable data about the performance of a device or system under test in response to the occurrence of a control plane event or other critical event.

FIG. 3 is an example graph reflecting the traffic involving two receiving nodes and one transmitting node. The drawing is merely an example, as the functioning of network traffic is not as precise or exact as shown. In addition, there may be overlaps in transmission of data packets regarding the first node and the second node, there may be gaps in transmission of data packets regarding the first node and the second node after the occurrence of a control plane event, and/or the traffic rate may not be as smooth or constant as shown.

Figure 4:
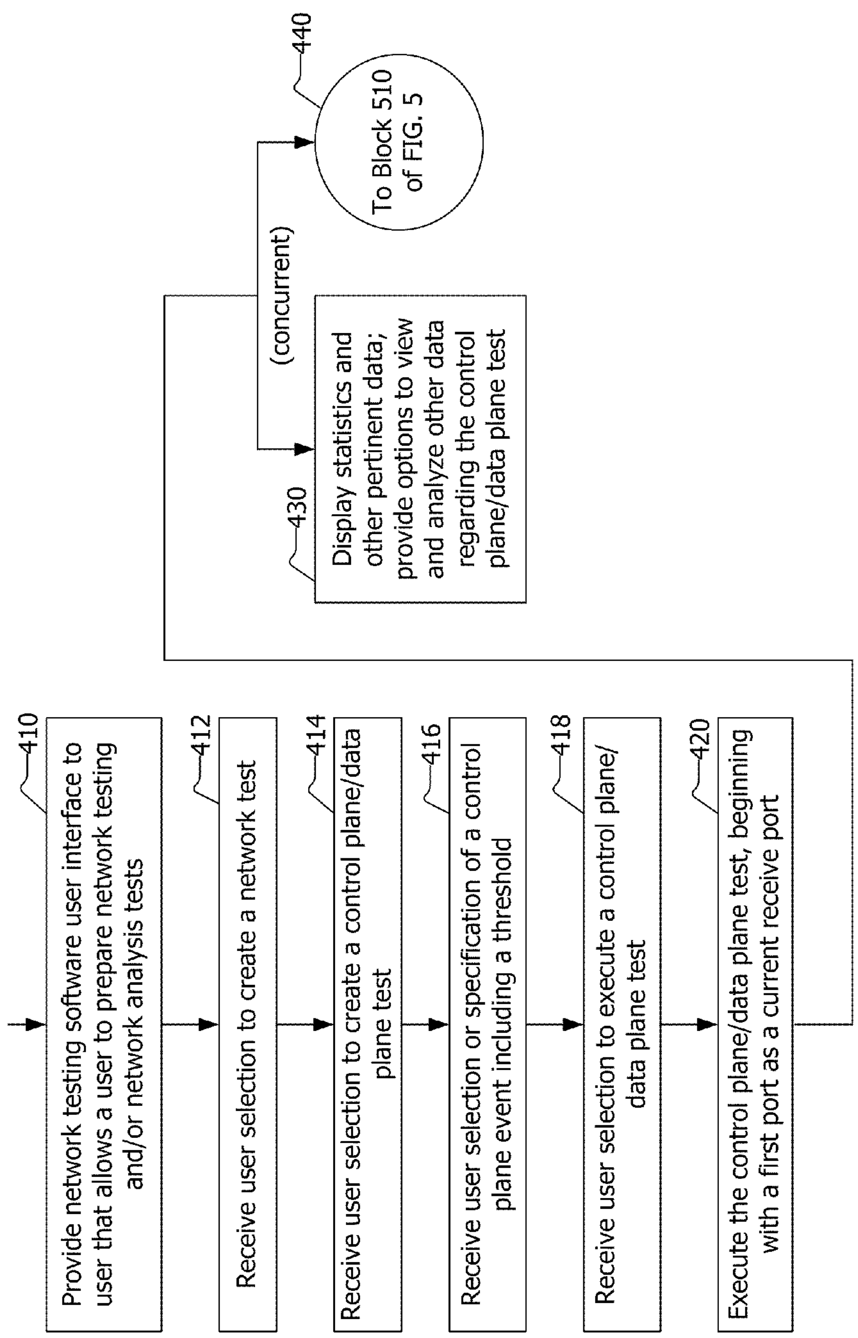
FIG. 4 is a flow chart of actions taken to implement control and data plane convergence.
Figure 5:
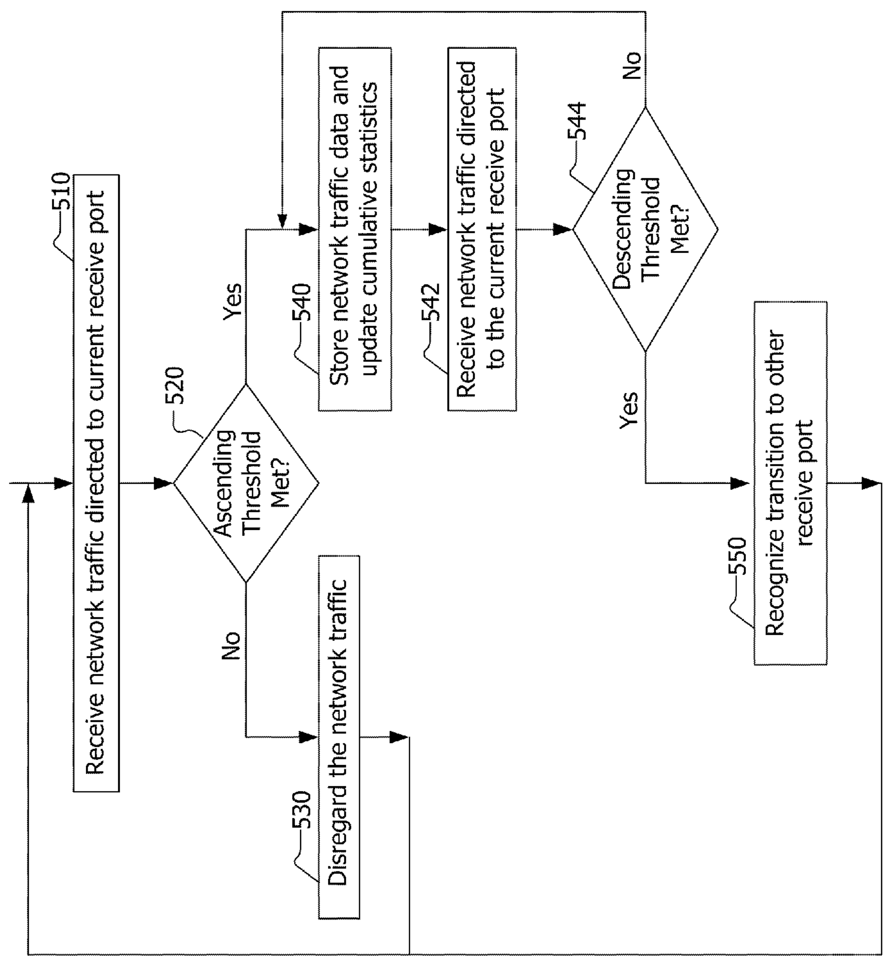
FIG. 5 is a flow chart of additional actions taken to implement control and data plane convergence.

Referring to FIGS. 4 and 5, flow charts of actions taken to implement control and data plane convergence are shown. In FIG. 4, a network testing software user interface is provided to a user to allow the user to prepare network testing and/or network analysis tests, including control plane/data plane convergence tests and analysis, as shown in block 410. A user selection to create a network test is received, as shown in block 412. A user selection to create a control plane/data plane test is received, as shown in block 414. Information pertinent to the control plane/data plane test is received from the user, including, user selection or specification of a control plane event including a threshold is received, as shown in block 416. The user may also specify or select a device or system under test to be included in the test. Control plane events and thresholds are described above, particularly regarding FIG. 3. User selection to execute a control plane/data plane test is received, as shown in block 418. The control plane/data plane test executes, beginning with a first port as a current receive port, as shown in block 420. While the control plane/data plane test executes, statistics and pertinent data may be displayed and options to view and analyze other data regarding the control plane/data plane test are provided to a user, as shown in block 430. Concurrent with the display of statistics and pertinent data, the flow of actions continues with block 510 of FIG. 5 as shown in block 440.

As shown in FIG. 5, network traffic directed to a current receive port is received, as shown in block 510. A check is made to evaluate whether the ascending threshold is met, as shown in block 520. If the ascending threshold is not met, as shown in block 520, the network traffic may be disregarded, that is, data about the network traffic is not stored, as shown in block 530. The flow of actions continues with the receipt of network traffic, as shown in block 510. When the ascending threshold is met, as shown in block 520, data about the network traffic (that is, network traffic data) is stored, as shown in block 540. The storing of network traffic data includes storing pertinent information obtained from the packets that make up the network traffic, namely receipt timestamp information. Pertinent information about key or important packets is also stored, such as the first packet received by the receive port, the first packet to reach the threshold, the last packet above the threshold, the first packet to drop below the threshold, the last packet at the second or next port, and/or others.

Network traffic directed to the current receive port is received, as shown in block 542 and a check is made to evaluate whether the descending threshold is met, as shown in block 544. Network traffic data is stored, as shown in block 540 so long as the descending threshold is not met. And as shown in block 430 of FIG. 4, while network traffic directed to the current receive port is received, after the threshold is met, statistics about the network traffic are displayed in real-time to the user. If the descending threshold is met, as shown in block 544, the device under test transitions to another receive port, and the network testing system recognizes the transition to another receive port, as shown in block 550. Network traffic data may be stored for both a current and next (for example, first and second) receive ports during the transition while network traffic is received at both the current and next (or last) receive ports. This would be an overlap. The network traffic data may be displayed in real-time or may be used to evaluate how the device under test behaved during the transition. This includes storing pertinent information obtained from the packets, and/or storing pertinent information about the packets, namely receipt timestamp information. Similar information about the last packet received by the current (first) receive port may also be stored. The flow of actions continues with block 510 of FIG. 5.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A network testing system having at least one network card, the network card including a processor, a memory and a network communications unit, the network testing system coupled with a network to which a device under test is also coupled, the network testing system having instructions stored thereon which when executed cause the network testing system to perform operations comprising:

receiving user selection to create a control plane and data plane test;

receiving test information from the user, the test information including user specification of the device under test, user selection of a control plane event, and user specification of a threshold, the threshold used as an ascending threshold and a descending threshold;

receiving user selection to execute the control plane and data plane test;

executing the control plane and data plane test, beginning with a first port the first port receiving network traffic;

evaluating whether the ascending threshold is met;

when the ascending threshold is not met, disregarding the network traffic received at the first port including not storing network traffic data about the network traffic received at the first port;

when the ascending threshold is met, storing the network traffic data about the network traffic received at the first port;

evaluating whether the descending threshold is met;

when the descending threshold is not met, continuing storing the network traffic data about the network traffic received at the first port;

when the descending threshold is met, recognizing the device under test transitioning to a second receive port;

the second port receiving network traffic;

evaluating whether the ascending threshold is met;

when the ascending threshold is not met, disregarding the network traffic received at the second port including not storing network traffic data about the network traffic received at the second port;

when the ascending threshold is met, storing the network traffic data about the network traffic received at the second port;

wherein the network traffic data includes information about a first packet reaching the ascending threshold on the second port and information about a last packet above the descending threshold on the first port;

computing statistics based on the network traffic data, the statistics including an inter-arrival time and at least one selected from the group including a ramp-up convergence time, a ramp-down convergence time, a control plane data plane convergence time, and a data plane convergence time;

displaying the statistics based on the network traffic data.

2. The network testing system of claim 1 wherein the network traffic data further includes information about at least one selected from the group including a last packet above the descending threshold, a first packet above the descending threshold, a last packet received at the second port, a first packet received at the second port, and a last packet received at the first port.

3. The network testing system of claim 1 wherein the inter-arrival time is based on a difference between a first timestamp of the first packet reaching the ascending threshold on the second port and a second timestamp of the last packet above the descending threshold on the first port.

4. The network testing system of claim 1 wherein the first port is included in a first network card of the network testing system and the second port is included in a second network card of the network testing system.

5. The network testing system of claim 1 having further instructions stored thereon which when executed cause the network testing system to perform further operations comprising:

obtaining a data plane timestamp for a current packet when the control plane event occurs.

6. The network testing system of claim 1 wherein the control plane and data plane event is when a route to the first port has been withdrawn.

7. The network testing system of claim 1 wherein the ascending threshold and the descending threshold are the same value and are a percentage of the maximum rate of traffic.

8. The network testing system of claim 7 wherein the percentage is user selectable and the maximum rate of traffic is communications protocol dependent.

9. A method performed by a network testing system having at least one network card, the network card including a processor, a memory and a network communications unit, the network testing system coupled with a network to which a device under test is also coupled, the method comprising:

receiving user selection to create a control plane and data plane test;

receiving test information from the user, the test information including user specification of the device under test, user selection of a control plane event, and user specification of a threshold, the threshold used as an ascending threshold and a descending threshold;

receiving user selection to execute the control plane and data plane test;

executing the control plane and data plane test, beginning with a first port;

the first port receiving network traffic;

evaluating whether the ascending threshold is met;

when the ascending threshold is not met, disregarding the network traffic received at the first port including not storing network traffic data about the network traffic received at the first port;

when the ascending threshold is met, storing the network traffic data about the network traffic received at the first port;

evaluating whether the descending threshold is met;

when the descending threshold is not met, continuing storing the network traffic data about the network traffic received at the first port;

when the descending threshold is met, recognizing the device under test transitioning to a second receive port;

the second port receiving network traffic;

evaluating whether the ascending threshold is met;

when the ascending threshold is not met, disregarding the network traffic received at the second port including not storing the network traffic data about the network traffic received at the second port;

when the ascending threshold is met, storing the network traffic data about the network traffic received at the second port;

wherein the network traffic data includes information about a first packet reaching the ascending threshold on the second port and information about a last packet above the descending threshold on the first port;

computing statistics based on the network traffic data, the statistics including an inter-arrival time and at least one selected from the group including a ramp-up convergence time, a ramp-down convergence time, a control plane data plane convergence time, and a data plane convergence time;

displaying the statistics based on the network traffic data.

10. The method of claim 9 wherein the network traffic data further includes information about at least one selected from the group including a last packet above the descending threshold, a first packet above the descending threshold, a last packet received at the second port, a first packet received at the second port, and a last packet received at the first port.

11. The method of claim 9 wherein the inter-arrival time is based on a difference between timestamps of the first packet reaching the ascending threshold on the second port and the last packet above the descending threshold on the first port.

12. The method of claim 9 wherein the first port is included in a first network card of the network testing system and the second port is included in a second network card of the network testing system.

13. The method of claim 9 further comprising:

obtaining a data plane timestamp for a current packet when the control plane event occurs.

14. The method of claim 9 wherein the control plane and data plane event is when a route to the first port has been withdrawn.

15. The method of claim 9 wherein the ascending threshold and the descending threshold are the same value and are a percentage of the maximum rate of traffic.

16. The method of claim 15 wherein the percentage is user selectable and the maximum rate of traffic is communications protocol dependent.

17. A machine readable storage device coupled with or included in a network testing system, the network testing system having at least one network card, the network card including a processor, a memory and a network communications unit, the network testing system coupled with a network to which a device under test is also coupled, the machine readable device having instructions stored thereon which when executed cause the network testing system to perform operations comprising:

receiving user selection to create a control plane and data plane test;

receiving test information from the user, the test information including user specification of the device under test, user selection of a control plane event, and user specification of a threshold, the threshold used as an ascending threshold and a descending threshold;

receiving user selection to execute the control plane and data plane test;

executing the control plane and data plane test, beginning with a first port;

the first port receiving network traffic;

evaluating whether the ascending threshold is met;

when the ascending threshold is not met, disregarding the network traffic received at the first port including not storing network traffic data about the network traffic received at the first port;

when the ascending threshold is met, storing the network traffic data about the network traffic received at the first port;

evaluating whether the descending threshold is met;

when the descending threshold is not met, continuing storing the network traffic data about the network traffic received at the first port;

when the descending threshold is met, recognizing the device under test transitioning to a second receive port;

the second port receiving network traffic;

evaluating whether the ascending threshold is met;

when the ascending threshold is not met, disregarding the network traffic received at the second port including not storing the network traffic data about the network traffic received at the second port;

when the ascending threshold is met, storing the network traffic data about the network traffic received at the second port;

wherein the network traffic data includes information about a first packet reaching the ascending threshold on the second port and information about a last packet above the descending threshold on the first port;

computing statistics based on the network traffic data, the statistics including an inter-arrival time and at least one selected from the group including a ramp-up convergence time, a ramp-down convergence time, a control plane data plane convergence time, and a data plane convergence time;

displaying the statistics based on the network traffic data.

18. The machine readable storage device of claim 17 wherein the network traffic data further includes information about at least one selected from the group including a last packet above the descending threshold, a first packet above the descending threshold, a last packet received at the second port, a first packet received at the second port, and a last packet received at the first port.

19. The machine readable storage device medium of claim 17 wherein the inter-arrival time is based on a difference between timestamps of the first packet reaching the ascending threshold on the second port and the last packet above the descending threshold on the first port.

20. The machine readable storage device of claim 17 wherein the first port is included in a first network card of the network testing system and the second port is included in a second network card of the network testing system.

21. The machine readable storage device of claim 17 having further instructions stored thereon which when executed cause the network testing system to perform further operations comprising:

obtaining a data plane timestamp for a current packet when the control plane event occurs.

22. The machine readable storage device of claim 17 wherein the control plane and data plane event is when a route to the first port has been withdrawn.

23. The machine readable storage device of claim 17 wherein the ascending threshold and the descending threshold are the same value and are a percentage of the maximum rate of traffic.

24. The machine readable storage device of claim 23 wherein the percentage is user selectable and the maximum rate of traffic is communications protocol dependent.

* * * * *

UNITED STATES PATENT AND TRADEMARK OFFICE

CERTIFICATE OF CORRECTION

PATENT NO. : 8,588,082 B2
APPLICATION NO. : 12/565412
DATED : November 19, 2013
INVENTOR(S) : Gintis et al.

It is certified that error appears in the above-identified patent and that said Letters Patent is hereby corrected as shown below:

In the Claims

Column 16, line 8, claim 19: delete "medium"

Signed and Sealed this
Seventh Day of January, 2014

Margaret A. Focarino
*Commissioner for Patents of the United States Patent and Trademark Office*